W. RANDALL.
FEED TROUGH.
APPLICATION FILED OCT. 13, 1910.
1,005,071.
Patented Oct. 3, 1911.
2 SHEETS—SHEET 1.
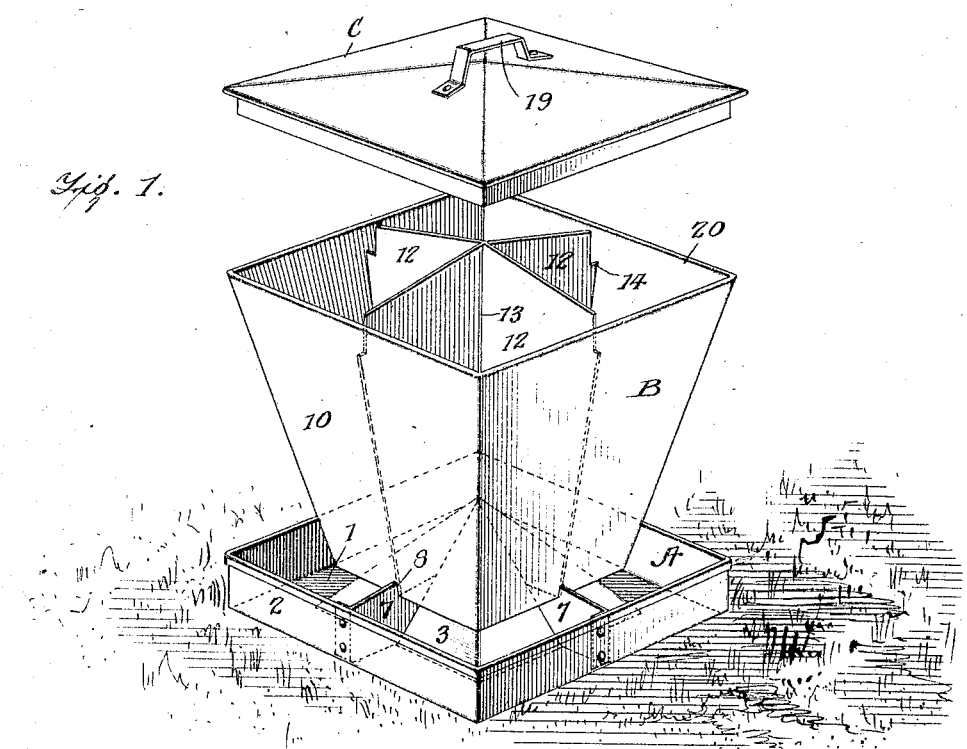
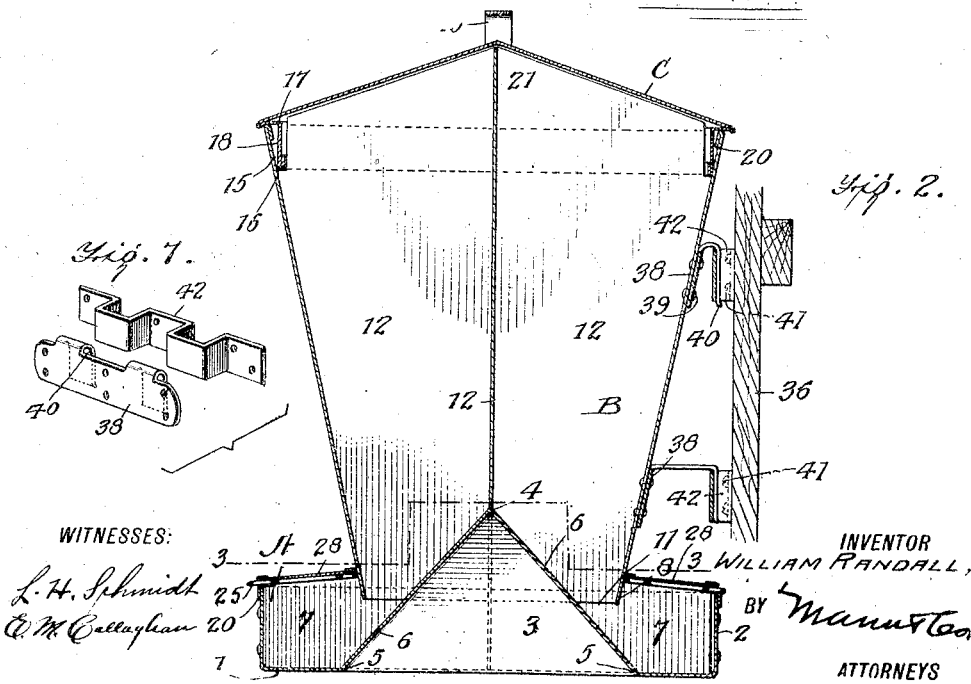

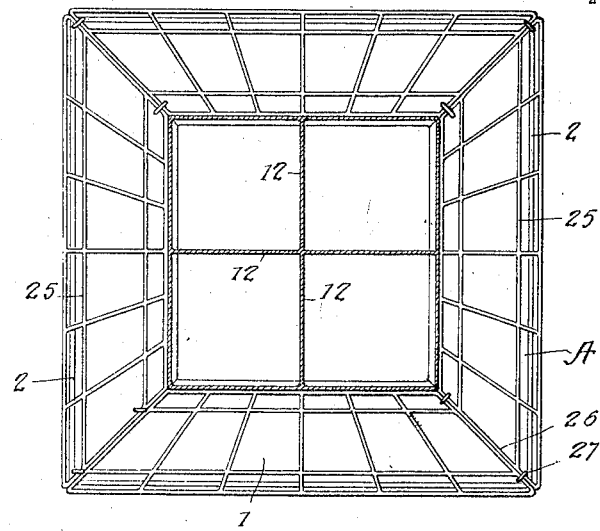
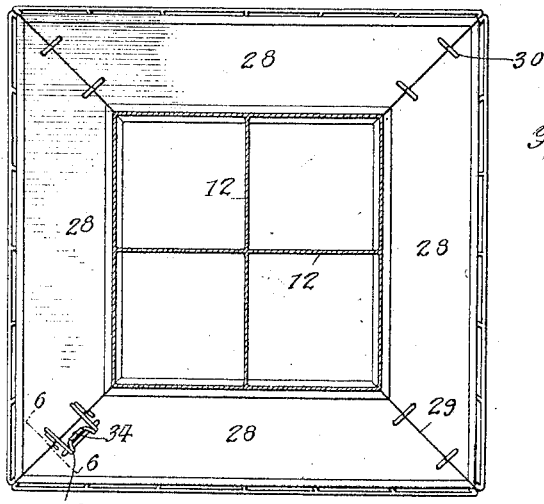
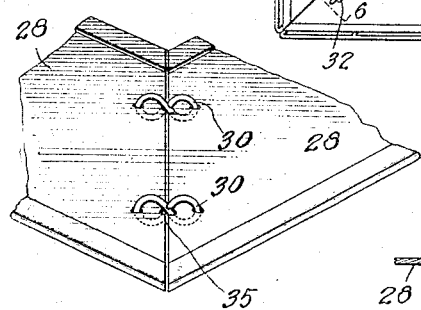
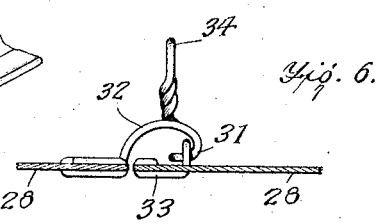

UNITED STATES PATENT OFFICE.

WILLIAM RANDALL, OF PORTLAND, OREGON.

FEED-TROUGH.

1,005,071. Specification of Letters Patent. Patented Oct. 3, 1911.

Application filed October 13, 1910. Serial No. 586,831.

*To all whom it may concern:*

Be it known that I, WILLIAM RANDALL, a citizen of the United States, residing at Portland, in the county of Multnomah and State of Oregon, have invented a new and useful Improvement in Feed-Troughs, of which the following is a specification.

My invention is an improvement in feed troughs, and consists in certain novel constructions, and combinations of parts, hereinafter described and claimed.

The object of the invention is to provide a simple and inexpensive trough of the character specified, wherein but a small amount of food is exposed at once, and wherein as the exposed food is removed the supply is renewed.

Referring to the drawings forming a part hereof, Figure 1 is a perspective view of the improvement with the cover lifted; Fig. 2 is a vertical section of the same; Fig. 3 is a section on the line 3—3 of Fig. 2 with the cover for the trough removed, and Fig. 4 is a section on the same line with the cover in place. Fig. 5 is an enlarged bottom plan view of a portion of the cover for the trough; Fig. 6 is a section on the line 6—6 of Fig. 4, and, Fig. 7 is a detail perspective view of the means for attaching the trough to a support.

The embodiment of the invention shown in the drawings consists of a base A, a body B, and a cover C. The base A is an open top, pan or receptacle consisting of a bottom 1, and sides and ends 2, and the bottom is provided at its center with a pyramidal boss 3, whose apex 4 extends above the upper edge of the sides and ends.

The base 5 of each side wall 6 of the boss is parallel with the adjacent side wall, and the said bases are at equal distances from the side and end walls of the receptacle, so that the apex 4 of the box is in a line perpendicular to the center of the receptacle. Each side wall of the base is connected to the adjacent side or end wall of the receptacle by a wing or partition 7, the said partition being arranged at the center of each of the said walls.

The body or hopper B of the trough is square in cross section, and is open at both ends, and gradually decreases in cross section from the top to the bottom. The upper edge of each of the partitions 7 is offset at its inner end, and a shoulder 9 is formed at the center of the said upper edge to receive the lower edge of the adjacent side wall 10 of the body.

The body rests on the four partitions of the base, and the shoulders 8 prevent lateral movement of the body with respect to the base. The said partition walls support the body above the bottom of the base, and away from the side walls 6 of the boss, so that a passage 11 is left between each side wall 10 of the body, and the adjacent side wall 6 of the boss.

The body is divided into four equal compartments, by means of partition walls 12. The four walls 12 are alike, and are connected at one edge at 13, and diverge from the connected edge at angles of 90° with respect to each other. Each wall 12 is cut away at its bottom edge to fit the boss, and the outer end of the upper edge of each of the said walls is notched at 14. Each of the walls 12 is in alinement with a partition 7 of the base. The cover C is also pyramidal in form, and is provided with a continuous marginal flange 15 on its lower face, the said flange being spaced apart inwardly from the free edge of the cover, and fitting inside of the side walls 10 of the body when the cover is in place.

The free edge of the flange is bent over upon itself to form a bead 16, and the said flange is formed by bending the edge of the cover inwardly at 17, and thence downwardly at 18. The flange fits into the notches 14, and is provided with a handle 19 for convenience in manipulating the cover. The upper edges of the body and base are also bent over upon themselves as shown at 20 to form a bead, for strengthening the said edges. The improved trough is preferably shaped from sheet metal, and the upper edges of the partition walls 12 of the body are inclined upwardly toward the center of the body as shown at 21, to fit closely the under face of the cover.

In use, the food, as for instance grain or other granulated material is placed in the body B, the cover C being removed for this purpose. The said food passes through the passages 11 until the receptacle or base is filled level with the lower edge of the walls of the body. As soon as this occurs, the flow is checked, until some of the food is removed from the receptacle. As the food is removed from the receptacle, that in the body passes downwardly to take its place. A constant supply of food is thus obtained, and the greater part of the food is protected in the body. The cover prevents the entrance of impurities into the body, and the overhanging walls of the body protect the food in the trough formed between the body and the side walls of the receptacle. The taper of the body is such that the edge of the cover 18 is almost directly above the adjacent side wall of the receptacle. The trough proper is separated into four independent devices by the walls 7, and each section of the trough is filled from a separate compartment in the body. Four kinds of food may be fed at once, and each kind will be isolated from the others at all times. The walls 12 in the body fit closely against the walls of the boss and each wall is in the same plane as the adjacent wall 7, so that the food from one compartment cannot pass into another compartment.

It will be evident that the improvement may be of any desired size, and of any suitable material. Considerable changes may also be made in the relative dimensions of the elements.

The base A is preferably covered by a screen 25 shown more particularly in Fig. 3 and consisting of four sections. Each section is beveled at its ends as shown at 26, and the ends of the sections are connected by rings 27. The inner side edges of the sections fit closely against the body, and the mesh of the screen is sufficiently fine to prevent the fowls from putting their feet in the trough and scratching out the food while large enough to permit the entrance of the heads of the fowls. A protecting cover shown in Fig. 4 is also provided to cover the trough between feeding times and the said cover consists of four sections 28, each of which is beveled at its end as shown at 29 to fit the end of the adjacent section and the inner edges of the sections fit closely against the body as shown in Fig. 4. The cover rests upon the screen and is of lesser width, the outer edge of the cover being approximately flush with the outer edge of the body. The screen as shown in Figs. 3 and 4 projects beyond the base and beyond the cover. The sections of the cover are connected by hinges 30, passing through alined openings in the adjacent ends of the sections. A detachable connection is provided at one corner, the said connection as shown more particularly in Fig. 6, consisting of a loop 31, connected with one section, and a hook 32 connected with the other. The loop is of considerable width as shown in Fig. 4 and the ends thereof are passed through openings in the section along the under face thereof and upward through other openings, the free end of the arms being bent down upon the upper face of the section as shown at 33 in Fig. 6. The hook is similarly connected and is provided with a handle 34, for convenience in disengaging the hook from the loop when it is desired to remove the cover. The hinge 30 connecting the adjacent ends of the sections as shown in Fig. 5 are of figure 8 shape and the adjacent edges of the ends are recessed at 35 to receive the crossed portion of the hinges.

The above construction of hinge permits the sections of the trough cover to be folded closely upon each other when the said cover is removed. The body is preferably supported from the fixed support 36 as shown in Fig. 2 by means of a plurality of double hooks shown more particularly in Fig. 7. Each of the hooks consists of a body 38, secured to the body B of the feeding trough by means of rivets 39, and two hooks 40 spaced apart from each other. A double hasp 42 is secured to the fixed support 36, by means of screws 41. The lower hook as shown in Fig. 2 is offset from the body, a sufficient distance to hold the said body in upright position.

I claim—

1. A device of the character specified, comprising a receptacle substantially rectangular in cross section and provided at its center with an upwardly extending pyramidal boss, a partition wall extending between each side of the receptacle and the adjacent side wall of the boss, each of said partitions having its upper edge offset downwardly intermediate its ends to form a shoulder between the said ends, a hopper having a cross section similar to that of the receptacle seated on the partitions, the shoulders engaging the outer faces of the hopper, said hopper having a partition adjacent to each of the partitions of the receptacle and in alinement therewith, and engaging the upper edge thereof, and a cover for the hopper.

2. A feed trough comprising a pan, and an open ended receptacle supported vertically above the center of the pan, said receptacle tapering inwardly toward its bottom, and a pointed boss on the bottom of the pan for deflecting the contents of the pan toward the sides thereof, said boss extending into the receptacle, and a screen above the pan, said screen consisting of a plurality of sections, each of the sections having its ends beveled to fit the ends of the adjacent sections, and extending from the side of the receptacle to the adjacent edge of the pan, the said sections being hinged together at their adjacent ends, and a removable cover resting on the screen, said cover consisting of sections corresponding approximately in shape and size to the sections of the screen, a hinged connection between the adjacent ends of the sections of the cover, one of said hinged connections being detachable to permit the removal of the cover.

3. A feed trough comprising a pan, and an open ended receptacle supported vertically above the center of the pan, said receptacle tapering inwardly toward its bottom, a pointed boss on the bottom of the pan for deflecting the contents of the pan toward the sides thereof, said boss extending into the receptacle and a screen above the pan, said screen consisting of a plurality of sections, each of the sections having its ends beveled to fit the ends of the adjacent sections, and extending from the side of the receptacle to the adjacent edge of the pan, the said sections being hinged together at their adjacent ends.

4. A feed trough comprising a pan and a tubular receptacle supported above the center of the pan and delivering thereto, the pan and the receptacle being provided with partitions in alinement with each other and abutting at their adjacent edges for dividing the said pan and receptacle into a plurality of compartments, and a cover for the pan, said cover consisting of sections hinged together at their adjacent ends and encircling the receptacle.

5. A device of the character specified, comprising a tubular receptacle, a pan below the receptacle, the bottom of the pan being spaced apart from the receptacle, said pan and receptacle having registering vertical partitions for dividing the pan and receptacle into a plurality of compartments, the partitions of the pan having shoulders for engaging the outer face of the receptacle to position the same above the pan.

WILLIAM RANDALL.

Witnesses:
 R. L. JAMES,
 LESLIE LOCKE.